United States Patent [19]
Antieau et al.

[11] Patent Number: 5,986,233
[45] Date of Patent: Nov. 16, 1999

[54] SUSCEPTOR HEATING DEVICE FOR ELECTRON BEAM BRAZING

[75] Inventors: Susan M. Antieau, Pittsburgh; Robert G. R. Johnson, Trafford, both of Pa.

[73] Assignee: The United States of America as represented by the United States Department of Energy, Washington, D.C.

[21] Appl. No.: 09/222,811

[22] Filed: Dec. 30, 1998

[51] Int. Cl.⁶ .................................................. B23K 15/06
[52] U.S. Cl. ............................ 219/121.13; 219/121.14; 219/121.12; 219/121.35
[58] Field of Search .................. 219/121.12, 121.13, 219/121.14, 121.15, 121.16, 121.17, 121.35

[56] References Cited

U.S. PATENT DOCUMENTS

| | | | |
|---|---|---|---|
| 4,091,257 | 5/1978 | Anthony et al. | 219/121.12 |
| 4,227,065 | 10/1980 | Paradi et al. | 219/121.35 |
| 5,021,628 | 6/1991 | Lemelson | 219/121.85 X |
| 5,599,468 | 2/1997 | Mako et al. | 219/121.14 |
| 5,814,784 | 9/1998 | Kinsman et al. | 219/121.64 X |

FOREIGN PATENT DOCUMENTS

| | | | |
|---|---|---|---|
| 1-48682 | 2/1989 | Japan | 219/121.14 |
| 3-155463 | 7/1991 | Japan. | |
| 453522 | 6/1968 | Switzerland | 219/121.35 |

*Primary Examiner*—Gregory Mills
*Attorney, Agent, or Firm*—John T. Lucas; William R. Moser; Paul A. Gottlieb

[57] ABSTRACT

A brazing device and method are provided which locally apply a controlled amount of heat to a selected area, within a vacuum. The device brazes two components together with a brazing metal. A susceptor plate is placed in thermal contact with one of the components. A serrated pedestal supports the susceptor plate. When the pedestal and susceptor plate are in place, an electron gun irradiates an electron beam at the susceptor plate such that the susceptor plate is sufficiently heated to transfer heat through the one component and melt the brazing metal.

13 Claims, 2 Drawing Sheets

SUSCEPTOR HEATING DEVICE FOR ELECTRON BEAM BRAZING

BACKGROUND OF THE INVENTION

1. Field of the Invention

The present invention relates to devices used in welding and, more particularly, to a device for transferring heat generated by an electron beam to a brazing metal during an election beam welding operation.

2. Related Art

Brazing is a method of joining components together with the use of a melted brazing alloy. The brazing alloy must have a lower melting temperature than any of the components. There are several different methods used to braze components together. One conventional method includes placing the components and the brazing metal in a furnace. However, the furnace method requires the use of enough energy to heat the entire structure, as opposed to just the areas being brazed. Another conventional method includes applying localized heat to the area being brazed by a gas torch or induction heating. This method can only be used with metals which do not produce a surface oxidation layer.

Metals which produce surface oxidation layers, such as Zircaloy and the high melting point refractory metals, require the use of an inert atmosphere or a vacuum to prevent oxidation. In a conventional method, an electron beam weld box is used. The weld box creates a vacuum and the electron beam is used as the localized heat source. With this method, it is difficult to control heating when applying the electron beam directly to the work piece, even if the beam is defocused to reduce the energy density.

Therefore, there exists a need in the art for a brazing device which can locally apply a controlled amount of heat to a selected area within a vacuum or inert environment.

SUMMARY OF THE INVENTION

In accordance with the invention, a brazing device and method are provided which, among other advantages, locally apply a controlled amount of heat to a selected area, within a vacuum or inert environment, so as to thereby overcome the above-mentioned deficiencies in the prior art.

According to one aspect of the invention, there is provided an electron beam brazing apparatus for brazing components together with a brazing metal, the apparatus including a susceptor plate of a high melting point, high thermal conductivity material disposed in thermal contact with one of the components; a pedestal supporting the susceptor plate; and an electron gun for irradiating the susceptor plate with an electron beam to provide sufficient heating of the susceptor plate to cause transfer of heat through the one component to melt the brazing metal and thereby braze the components together.

In a preferred embodiment the pedestal has a lower thermal conductivity than the susceptor plate while in a more preferred embodiment, the pedestal is formed of hafnium and the susceptor plate is formed of molybdenum.

Advantageously, an oxide layer formed on the surface of the susceptor plate in contact with the pedestal.

The susceptor plate is preferably formed in the shape of a ring and comprises two sections.

A control means is preferably provided for controlling the power level of the electron beam so that the temperature of the susceptor plate is increased at a predetermined, smooth rate.

Advantageously, a surface of the pedestal in contact with the susceptor plate is serrated.

In a preferred implementation, the components which are brazed together comprise ceramic components.

Other features and advantages of the invention will be set forth in, or apparent from, the following detailed description of preferred embodiments of the invention.

DESCRIPTION OF THE PREFERRED EMBODIMENTS

Figure 1:
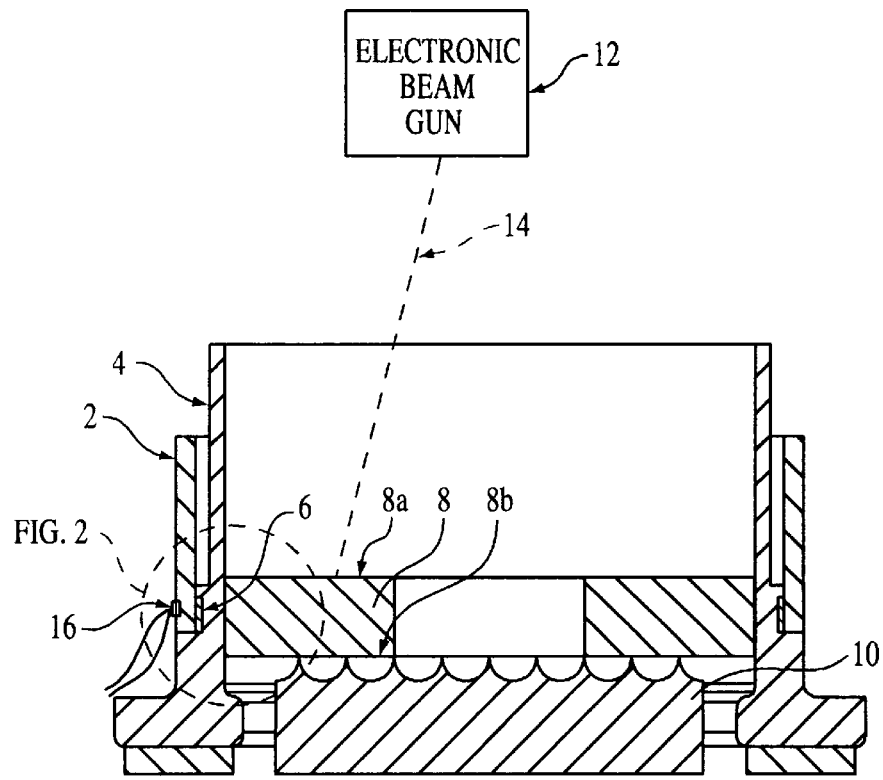
FIG. 1 is a side elevation view of the electron beam susceptor heating arrangement in accordance with a preferred embodiment of the invention.
Figure 2:
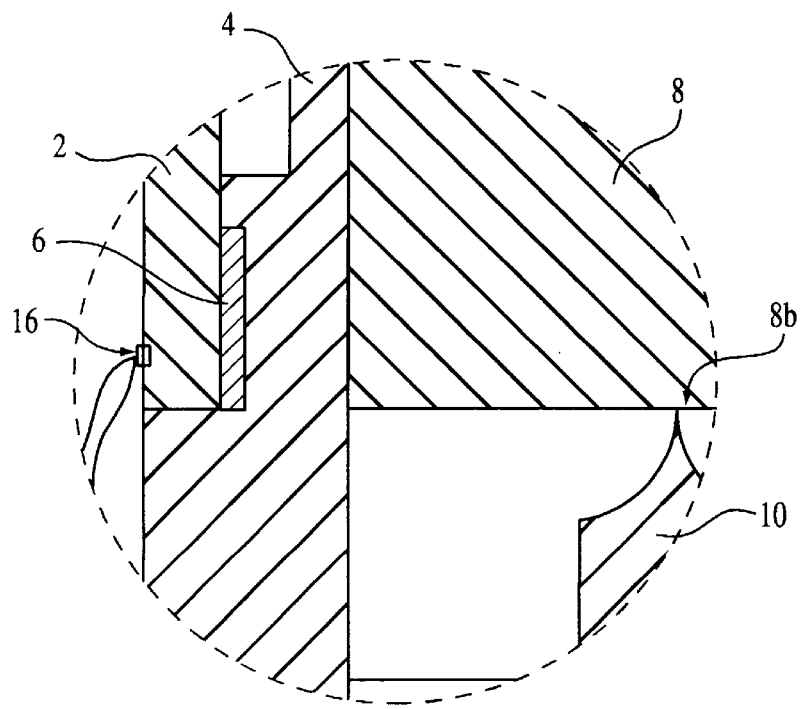
FIG. 2 is an enlarged view of the encircled area A of FIG. 1.

A preferred embodiment of the susceptor heating arrangement of the invention is shown in FIGS. 1 and 2. In this embodiment, a niobium outer seal ring 2 is to be brazed to a molybdenum inner shield 4 of a generally cylindrical shape, although it is evident that other components of different shapes and made of different materials can be brazed together using the susceptor heating arrangement of the invention. A titanium brazing alloy 6 is positioned between a portion of the inner surface of the outer ring 2 and an opposed portion of the outer surface of the inner shield 4. A susceptor ring 8 is positioned inside of the inner shield 4 and directly across from, i.e., in registration with, the brazing alloy 6.

Susceptor ring 8 is made of a high melting point, high thermal conductivity material. Molybdenum is preferably used to make the susceptor ring 8 because of its high melting point, high thermal conductivity and low thermal expansion. A high melting point material is required because the susceptor must reach a high enough temperature to efficiently transfer enough heat to melt the brazing alloy 6. In addition, low thermal expansion is desirable to prevent over stressing of the work piece, i.e., inner shield, due to expansion of the susceptor ring 8 into inner shield 4 during heating.

Figure 3:
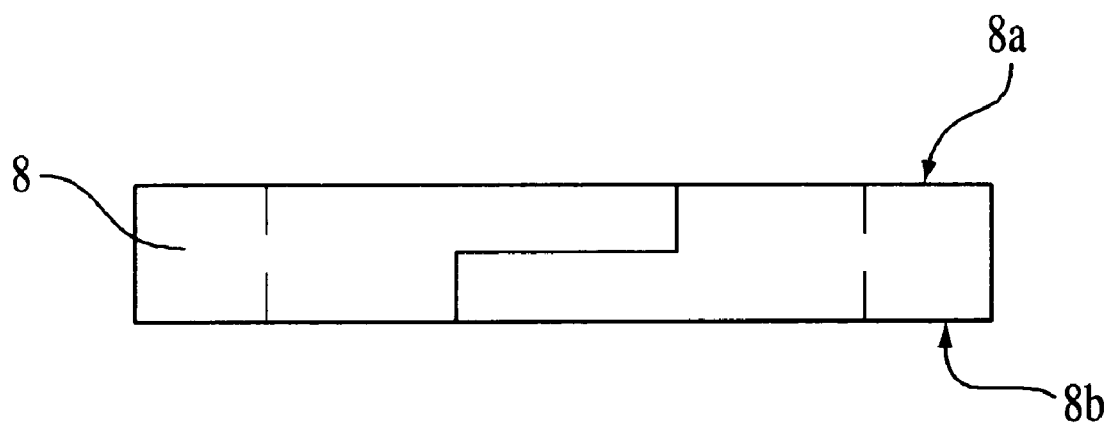
FIG. 3 is a side elevational view of the susceptor ring used in accordance with a preferred embodiment of the invention.

In a preferred embodiment thereof illustrated in FIG. 3, the susceptor ring 8 is machined in two halves for easy insertion into the interior of the cylindrical inner shield 4. When inside the inner shield 4, the susceptor ring 8 is snapped together to form a continuous susceptor ring. FIGS. 1 and 2 show susceptor ring 8 making moderate contact with the inner shield 4. Such moderate contact is desired to efficiently transfer heat from the susceptor ring 8 to the inner shield 4.

Figure 4:
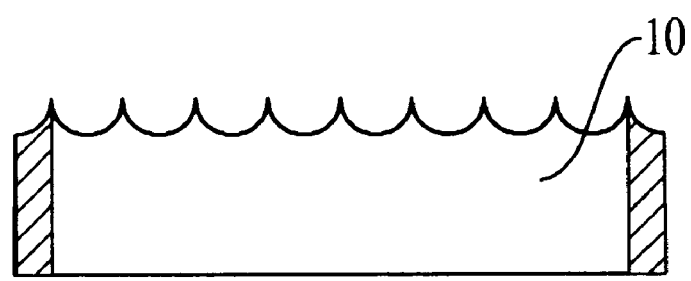
FIG. 4 is a side elevational view of the serrated pedestal used in accordance with a preferred embodiment of the invention.

Referring again to FIG. 1, the susceptor ring 8 is supported by serrated pedestal 10, best seen in FIG. 4. The serrated pedestal 10 is preferably made from a high melting point material with a lower thermal conductivity than the susceptor ring 8 so as to minimize heat losses from the susceptor ring 8. In a preferred embodiment, the serrated pedestal 10 is formed of hafnium. Hafnium has a melting point over 4000° F. and a thermal conductivity approximately one-sixth that of molybdenum. As shown in FIG. 1, the lower surface 8b of the susceptor ring 8 rests on the serrated edges of serrated pedestal 10, which helps to minimize heat transfer out of the susceptor ring 8.

In a preferred embodiment, the lower surface of the susceptor ring 8b is coated with a thin film of oxide (not shown) to prevent bonding of the susceptor ring 8 to the serrated pedestal 10. If there is a danger of the susceptor ring 8 bonding to the inner shield 4, a thin oxide coating can also be applied to the heat transfer surface of the susceptor ring 8.

After the components are assembled, the assembly is loaded into an electron beam weldbox (not shown) including an electron beam gun 12. The electron beam gun 12 is aligned with the centerline of the inner shield 4. An electron beam 14 produced by the electron beam gun 12 strikes the upper surface 8a of the susceptor ring 8. The electron beam 14 is defocused when it strikes the susceptor ring 8. Defocusing is achieved by rastering the electron beam 14 across the surface of the susceptor ring 8a or by using spot patterns to reduce the energy density. It is preferred that the electron beam 14 is rotated around surface 8a with a rotation speed sufficiently high to maintain a uniform temperature around the susceptor ring 8.

Visually aligning the electron beam 14 on top of the susceptor ring 8 may be difficult with the entire assembly in place. Therefore, the susceptor ring 8 and serrated pedestal 10 may be positioned under the electron gun 12, without the rest of the components. The positions of the susceptor ring 8 and serrated pedestal 10 are then marked on the welding table (not shown). After the alignment is completed, the rest of the assembly is placed on the welding table at the pre-established position. Exact alignment is not necessary. Any portion of the electron beam 14 that strikes the inner shield 4 is reflected back onto the susceptor ring 8 due to the shallow angle between the electron beam 14 and the inner shield 4.

In operation, the electron beam 14 heats the susceptor ring 8. Heat from the susceptor ring is transferred to the inner shield 4 and then to the brazing alloy 6. In a preferred embodiment, the operation of the electron beam gun 12 is computerized so that the power level of the electron beam 14 is programmed to increase at a given rate to bring the brazed joint smoothly and evenly up to the brazing temperature. In another embodiment, the power level of the electron beam 14 is raised in steps while monitoring the joint temperature with one or more thermocouples indicated at 16 and connected to the surface of outer seal ring 2, in registration with brazing alloy 6. Raising the temperature in small steps prevents overshooting of the brazing temperature. After the brazing alloy 6 is melted, the power of the electron beam 14 can either be reduced abruptly to produce a high cooling rate or gradually, with intermediate holds, to anneal the joint.

The heat of the susceptor ring 8 is a function of the accelerating voltage used in the electron beam gun 12, the electron beam current, the electron beam focus and the speed of rotation of the electron beam 14.

In another embodiment, the inner shield 4 and the outer ring 2 are made of ceramic. With conventional devices, ceramics can not be joined by an electron beam method because it is not possible to direct an electron beam at an insulator. However, the metallic susceptor heat transferring ring 8, used in accordance with the present invention, will perform the same on ceramics as on metals.

Although the invention has been described in detail with respect to preferred embodiments thereof, it will be apparent to those skilled in the art that variations and modifications can be effected in these embodiments without departing from the spirit and scope of the invention. For example, as noted above, the invention can be used to braze materials which are not concentrically shaped.

We claim:

1. An electron beam brazing apparatus for brazing components together with a brazing metal in a vacuum, said apparatus comprising:

a susceptor plate made of a material having a high melting point and high thermal conductivity and disposed in thermal contact with one of said components;

a pedestal supporting said susceptor plate;

an oxide layer disposed between said susceptor plate and said pedestal; and an electron gun for irradiating said susceptor plate with an electron beam to provide sufficient heating of said susceptor plate to transfer heat through said one of said components to melt said brazing metal and thereby braze said components together.

2. The apparatus according to claim 1, wherein said pedestal has a lower thermal conductivity than said susceptor plate.

3. The apparatus according to claim 2, wherein said pedestal is formed of hafnium and said susceptor plate is formed of molybdenum.

4. The apparatus according to claim 1, wherein said susceptor plate is in the shape of a ring and comprises two sections joined together to form said ring.

5. The apparatus according to claim 1, further including a control means for controlling the power level of said electron beam such that the temperature of said susceptor plate is increased at a predetermined smooth rate.

6. The apparatus according to claim 1, wherein an edge surface of said pedestal in contact with said susceptor plate is serrated.

7. The apparatus according to claim 1, wherein said components are ceramic.

8. An electron beam brazing apparatus for brazing components together with a brazing metal in a vacuum, said apparatus comprising:

a molybdenum susceptor plate in thermal contact with one of said components;

a pedestal having a serrated edge in contact with and supporting said susceptor plate; and an electron gun for irradiating said susceptor plate with an electron beam to provide sufficient heating of said susceptor plate to transfer heat through said one of said components to melt said brazing metal.

9. The apparatus according to claim 8 wherein a surface of said susceptor plate in contact with said pedestal has an oxide layer formed thereon.

10. The apparatus according to claim 8, further including a control means for controlling the power level of said electron beam such that the temperature of said susceptor plate is increased at a predetermined smooth rate.

11. A method of brazing components together with a brazing metal, said method comprising:

placing each of said components in direct contact with said brazing metal to form a work piece;

placing a susceptor plate in thermal contact with said work piece, said susceptor plate being supported by a pedestal with an oxide layer disposed between said susceptor plate and said pedestal; and irradiating said susceptor plate with an electron beam having sufficient energy to heat said susceptor plate and melt said brazing metal so as to braze the components together.

12. The method of claim 11 wherein said pedestal is of lower thermal conductivity than said susceptor plate.

13. The method of claim 11 further including a step of:

controlling the power level of said electron beam so that said brazing metal temperature approaches the melting point at a smooth rate.

* * * * *